United States Patent
Dance et al.

(10) Patent No.: US 7,667,158 B2
(45) Date of Patent: Feb. 23, 2010

(54) WORKPIECE STRUCTURE MODIFICATION

(75) Inventors: Bruce Guy Irvine Dance, Cambridgeshire (GB); Ewen James Crawford Kellar, Cambridgeshire (GB)

(73) Assignee: The Welding Institute, Cambridge (GB)

( * ) Notice: Subject to any disclaimer, the term of this patent is extended or adjusted under 35 U.S.C. 154(b) by 493 days.

(21) Appl. No.: 10/528,966

(22) PCT Filed: Sep. 11, 2003

(86) PCT No.: PCT/GB03/03927
§ 371 (c)(1), (2), (4) Date: Mar. 18, 2005

(87) PCT Pub. No.: WO2004/028731
PCT Pub. Date: Apr. 8, 2004

(65) Prior Publication Data
US 2006/0163222 A1 Jul. 27, 2006

(30) Foreign Application Priority Data
Sep. 30, 2002 (GB) ................. 0222624.9
Feb. 17, 2003 (GB) ................. 0303619.1

(51) Int. Cl.
*B23K 26/00* (2006.01)
(52) U.S. Cl. .............. 219/121.66; 219/121.69; 219/121.85
(58) Field of Classification Search ........... 219/121.65, 219/121.66; 156/272.8
See application file for complete search history.

(56) References Cited

U.S. PATENT DOCUMENTS

| | | | | |
|---|---|---|---|---|
| 4,746,540 A | * | 5/1988 | Kawasaki et al. ............. 427/597 |
| 4,768,897 A | * | 9/1988 | Nussbaumer et al. .... 405/129.9 |
| 4,850,089 A | * | 7/1989 | Monfort et al. ............. 148/512 |
| 4,861,407 A | * | 8/1989 | Volkmann et al. ......... 156/272.8 |
| 4,931,125 A | * | 6/1990 | Volkmann et al. ......... 156/272.8 |
| 4,959,275 A | * | 9/1990 | Iguchi et al. ................ 428/603 |
| 4,968,383 A | * | 11/1990 | Volkmann et al. ............. 216/65 |
| 5,353,865 A | * | 10/1994 | Adiutori et al. ............. 165/133 |
| 5,473,138 A | * | 12/1995 | Singh et al. ............ 219/121.69 |
| 5,601,737 A | * | 2/1997 | Asahi et al. ............ 219/121.66 |
| 6,013,336 A | * | 1/2000 | Baumgart et al. ........... 427/555 |
| 6,096,445 A | * | 8/2000 | Terakado et al. ......... 428/848.3 |
| 6,176,959 B1 | * | 1/2001 | Clarke ..................... 156/272.8 |
| 6,455,807 B1 | * | 9/2002 | Scott ..................... 219/121.72 |
| 6,559,926 B2 | * | 5/2003 | Yamaguchi et al. ........... 355/53 |
| 6,709,985 B1 | * | 3/2004 | Goruganthu et al. ........ 438/706 |
| 6,919,162 B1 | * | 7/2005 | Brennen et al. .......... 430/272.1 |
| 2006/0233999 A1 | * | 10/2006 | Kurt et al. .................. 428/64.4 |

FOREIGN PATENT DOCUMENTS

| | | | |
|---|---|---|---|
| EP | 0626228 | | 11/1994 |
| JP | 62006449 A | * | 1/1987 |
| JP | 63256207 | | 10/1988 |
| JP | 411044307 A | * | 2/1999 |

* cited by examiner

*Primary Examiner*—Samuel M Heinrich
(74) *Attorney, Agent, or Firm*—Martin Novack

(57) ABSTRACT

A method of modifying the structure of workpiece (1) is provided. The method comprises a first step of causing relative movement between a power beam and the workpiece (1) so that a region (3) of the workpiece (1) is melted and the melted material displaced to form a projection (2) at a first location in the region (3) and a hole (4) at a different location in the region. The melted material is then allowed to at least partially solidify after which the first step is repeated one or more times, with the region corresponding to each repeat intersecting the region (3) of the first step.

40 Claims, 15 Drawing Sheets

| Class of joint | Specific joint description | |
|---|---|---|
| Butt joint | Conventional butt joint | |
| | Tongue and groove | |
| | Scarf tongue and groove | |
| | Landed scarf tongue and groove | |
| | Dovetail joint | |
| Bonded doubler | | |
| Lap joints | Unsupported single lap | |
| | Tapered single lap | |
| | Double lap | |
| | Rebated lap joint | |
| Strap joints | Single strap joint | |
| | Double strap joint | |
| | Tapered strap joint | |
| Step joints | Step joint | |
| | Double step joint | |
| | Symmetric stepped joint | |
| | Asymmetric stepped joint | |
| Scarf joints | Asymmetric scarf joint | |
| | Symmetric scarf joint | |

Fig.32.

| Test/figure reference | T163 fig 13 & 14 | T144 fig 15 | T155 fig 16 | T314 (a) fig 17 | T314 (b) fig 17 | T240 fig 18 | T299 fig 19 | T291 fig 20 |
|---|---|---|---|---|---|---|---|---|
| Accelerating voltage (kV) | 130 | 130 | 130 | 130 | 130 | 130 | 130 | 130 |
| Beam current (mA) | 3.8 | 2.4 | 2.6 | 2.4 | 2.4 | 4.2 | 2.4 | 5.2 |
| Beam power (W) | 494 | 312 | 338 | 312 | 312 | 546 | 312 | 676 |
| approximate beam diameter (mm) | 0.16 | 0.14 | 0.15 | 0.10 | 0.10 | 0.15 | 0.10 | 0.12 |
| working distance (mm) | 196 | 196 | 196 | 240 | 240 | 285 | 240 | 240 |
| focus setting (au) | 4.05 | 4.05 | 4.05 | 3.84 | 3.84 | 3.685 | 3.82 | 3.82 |
| Primary deflection pattern | SQ240 | lin 40 | SQ 240 | 4H +110 | 4H +110 | 4H+110 | 4H+110 | 4H+110 |
| Secondary deflection pattern | snowflake rev 1.1 | super Q rev 4 | quad q rev1.1 | UV.2 | n/a | UV.1 | n/a | UV.1 |
| Motif show in Figure number | 21E | 21D | 21C | 21A | 21F | 21B | 21F | 21F |
| motif spacing (mm) | 1.9 | 0.77 | 1.8 | 4.0 | 4.0 | 0.8 | 1.3 | 1.75 |
| 1° deflection pattern frequency (Hz) | 2 | 25 | 1.0 | 1.01 | 2.5 | 1.5 | 2.5 | 2 |
| 2° deflection pattern frequency (Hz) | 480 | 1000 | 240 | 2201 | n/a | 0.075 | n/a | 0.075 |
| swipe length (mm), (plus 'drift' displacement) | 1.05 | 1.5 | 2.5 | 0.7(3) | 3.1 | 3.0 (1.0) | 3.0 | 3.0 |
| swipe duration (ms) | 0.35 | 1.0 | 1.04 | 0.11 | 2.2 | 1.5 | 0.91 | 1.14 |
| average swipe speed (in x-y plane) (ms⁻¹) | 3.0 | 1.5 | 2.4 | 6.3 | 1.4 | 2 | 3.3 | 2.63 |
| time interval between intersecting swipes (ms) | 0.35 | 25 | 1.04 | 1000 | 990 | 1500 | 0.4 | 500 |

Fig.32 (Cont).

| | | | | | | | | |
|---|---|---|---|---|---|---|---|---|
| approximate projection height (mm) | 1.0 | 1.5 | 1.1 | 0.4 | 1.0 | 1.5 | 1.0 | 1.1 |
| approximate minimum projection width (mm) | 0.15 | 0.15 | 0.15 | 0.7 | 0.1 | 0.2 | 0.07 | 0.3 |
| approximate cavity depth (mm) | 1.0 | 2.0 | 1.0 | 0.4 | 0.5 | 1.8–2.0 | 1.2 | 1.8–2.0 |
| number of motif pattern repeats at each location (=n) | 20 | 20 | 10 | 20 | 30 | 17 | 50 | 10,+8 |
| base material | 316L stainless steel | 316L stainless steel | 316L stainless steel | Mild steel | Mild steel | Ti 6,4 | Mild steel | Al 5083 |
| thickness (mm) | 6.4 | 6.4 | 6.4 | 12.7 | 12.7 | 3 | 12.7 | 2.0 |

Notes: Vacuum ~1x10$^{-3}$ mbar. All SI units indicated in parentheses, except (au) arbitrary machine specific units. Minimum cavity width approximately equal to beam diameter in most cases.

WORKPIECE STRUCTURE MODIFICATION

The present invention relates to a method of modifying the structure of a workpiece, and to workpieces so modified.

The use of power beams, for example electron beams (EB) and laser beams for surface modification is already well known. Several different methods exist for changing the surface properties of a material in which a power beam is used to remove, chemically modify, or displace material on the surface of the work. Several of these are already subject to patent applications and patent grants.

In the conventional EB drilling process for most metals or other materials which exhibit a liquid phase, the process is applied as follows. First, a high power density beam makes a blind "keyhole" in the material. This "keyhole" typically consists of a narrow, deep hole. On the sides of the hole there is a layer of molten material. The hole is held open predominantly by the vapour pressure of the material, which will be at or near its boiling point in the area of highest beam power density. Second, the beam is allowed to dwell for a sufficient length of time that the hole becomes through penetrating rather than blind. Third, the beam is allowed to dwell a little longer at the same location, so that the beam impinges on backing material that is close-fitting to the rear of the work. This backing material is volatile, and produces a burst of gaseous material that expels almost all of the molten material from the sides of the hole.

It should be noted that this type of drilling operation cannot produce clean "blind" holes because there is no force present which is capable of expelling all the liquid material.

In the case of a material that does not exhibit a liquid phase, or may be chemically converted directly to a gaseous phase, a drilling or cutting operation may be accomplished without backing material. In this instance blind holes may be made.

Likewise a "gas assist" in which a jet of gas is applied to the molten material in order to displace it for cutting and drilling purposes is also employed in many cases, e.g. using a laser.

Various methods exist which include the use of power beams to remove material from the surface of the work so as to leave upstands of essentially unaltered material, and in this way a functional surface may be obtained.

Techniques also exist in which the material may be displaced in the liquid phase to alter the functionality of the surface. In one variant, the material is textured by a power beam that is either stationary with respect to the surface of a moving workpiece, or is moved relative to the surface in the same direction as the workpiece motion within a fixed frame of reference. In this way usually shallow holes of a round or elongated shape, with approximately uniform raised edges are made. The surface textures incorporating features of this type are utilised in the preparation of rolls for use in steel mills, in which the texture is imparted to the rolled steel product.

In a second "surface texturing" process, the electron (or laser) beam is manipulated in multiple directions at the site of each hole, with the result that the displaced material can be manipulated in a specific fashion. If adjacent features are created whilst the previous ones are still molten, or at least still very hot, displaced molten material from different holes may be combined, or the entire surface can be well fused. This second technique is therefore capable of making a wide variety of functional surfaces. This is described in GB-A-2375728.

Both the material displacement techniques outlined above tend to produce characteristic surfaces. In the former case, the displaced material is uniformly distributed only if the holes are relatively shallow in relation to their diameter. In the second case, the holes may be of comparable depth in relation to their width, provided the material displaced from them is removed from the hole in the right way. The displaced material from the holes, alone or in combination with other molten displaced material from adjacent holes, solidifies in characteristic formations. These are similar to one another only in the fact that their shape is dictated to some extent by surface tension forces.

In most metals, the displaced material tends where possible to adopt a quasi-spherical shape. The connection between the displaced material and the substrate, and thus the shape of the redeposited displaced material, is influenced by the wetted area and temperature of both the substrate and the displaced material. The overall effect is that in most metals, upstanding features above the original substrate surface are limited in their height/width ratio. In particular, the height of any given area of redeposited material above the original substrate surface is most unlikely to significantly exceed its width.

In the present invention, a new power beam treatment is described, in which a novel treatment is used to predominantly displace material in the liquid phase in order to create novel types of structure. In the present invention, a location on the workpiece is exposed to a moving power beam in a particular way on two or more, preferably numerous, occasions. In contrast to the previous methods described, the displaced material from each location is allowed to substantially solidify in a new position before the power beam is used at the same or an immediately adjacent location again.

The effect of this is that the displaced material from one visit of the beam to a particular location on the workpiece surface may subsequently be overlapped by more displaced material. This can either be more material from the same location, or more material displaced from an alternate location. Likewise the holes formed as a result of material displacement may also be overlapped to produce a new type of structure.

The technique is not limited to the production of new surface structures, since it can also be used to modify the structure deeper within a workpiece so as to effect true structure modification in the bulk material.

The result of this novel process is that the usual constraints imposed upon the geometry of the solidified material (and the holes also created) described above are no longer apparent. Using this technique, new features may be "grown" on the surface by using successive visits of the beam to a particular location. Deep holes can also be formed within the material and these may be accompanied either by corresponding localised surface protrusions or by plateau regions accommodating the displaced material. Such features may be many times greater in height/depth than width, in contrast to those manufactured by the existing techniques.

In accordance with a first aspect of the present invention, a method of modifying the structure of a workpiece comprises:
1) causing relative movement between a power beam and the workpiece so that a region of the workpiece is melted and the melted material displaced to form a projection at a first location in the region and a hole at a different location in the region;
2) allowing the melted material at least partially to solidify; and thereafter
3) repeating step 1) one or more times, the region corresponding to each repeat intersecting the region of step 1).

The invention therefore provides a new method of modifying the structure of a workpiece, this including bulk and/or surface structure modifications.

The projections formed using the method can take many different forms such as humps, spikes, plateaus and so on. Likewise the holes can be of various different forms. These include penetrating holes, blind holes, cavities, craters channels, depressions and also enclosed holes which provide porosity. Some specific examples of these projections and holes are discussed later. Each of these features is generally defined according to the shape of the material that surrounds it, within its immediate vicinity. Therefore, projections may be produced within holes inside the workpiece and likewise, holes may be formed in projections which themselves stand proud of a general workpiece surface. Holes can also be formed within the internal surfaces defining existing holes, and similarly projections may be built upon other projections.

The method provides a means of radically changing the structure of a workpiece in either a local or extensive manner. This in turn can be used to control various local or extensive properties. The following bulk (isotropic/anisotropic) and/or surface properties are some examples of those that may be modified using the method:—Electrical, magnetic, mechanical, chemical, load-bearing, wetting, frictional, elastic, thermal, emissive, aerodynamic, hydrodynamic, deformation, hysteresis, density, yield, conformation, crystallographic orientation, corrosion, adhesion.

The workpiece itself is typically a single material workpiece. However, it may take the form of two or more workpieces, as a compound workpiece, where the region(s) span the interface between the component workpieces. In this way the method can be used to join the workpieces together which is beneficial in for example providing electrical connections between the component workpieces.

The melted region(s) may take a number of forms. Each region is preferably defined by the beam being caused to travel relative to the workpiece along a path from a start position to a finish position. Therefore such forms of region include elongate regions, which may be curved or rectilinear either wholly or in part, and having start and finish points of the relative beam movement that are displaced. Preferably the length of such a path is therefore substantially at least three beam diameters. The simplest example of an elongate region is a rectilinear region. However, other forms of melted region include curves and loops, such as various fractions of a circumferential path defining a circle.

Typically, the beam is caused to follow a particular path such that the locations of the projection and hole are at opposed ends of the beam path. However, due to the physics associated with the process, the projection is typically formed at the beginning of the beam path, with the hole at the finish end. The melted material in each case flows in a manner which is substantially coincident with the region in question. However, such coincidence may not be total due to the larger volume of the material in the liquid phase in comparison with that of the solid matrix from which it is formed, and due to the flow dynamics of the process.

In some cases the various paths taken by the beam with respect to the workpiece in the one or more subsequent steps are not identical. This allows for different forms of features to be produced. Alternatively, each of the regions of step 3) may coincide substantially with the region of step 1).

The method may also comprise forming one or more groups of regions, each group intersecting the region of step 1). In this case the holes of each group may be arranged to be substantially co-incident with the hole of the region of step 1). The projections may likewise be arranged in coincidence. The groups of regions may also be arranged in a regular array.

The at least partial solidification of each region has an associated finite timescale and the efficient use of the power beam can be effected by forming one or more regions elsewhere on the substrate during such solidification.

Workpieces formed from more than one material, such as those provided with a coating, may also be used so that an alloy is formed during the performance of the method. One or more further materials may be added during the performance of the method to achieve alloying, for example the method may also be performed in a gaseous atmosphere to provide suitable alloying.

Various projection morphologies can be effected using the method, for example the intersecting regions may be arranged so as to form projections which overhang the workpiece surface. These may act as hooks when the surface is involved in joining, thereby increasing the joining effect. Such protrusions may also be agglomerated to form structures standing proud of the surface. For example a number of overhanging protrusions may be used to form loops above the workpiece surface.

In some cases it is desirable for the holes and projections formed to have smoothed surfaces. In fact, with the use of appropriate parameters, in many materials these structures, particularly the holes, can be formed with remarkably smooth surfaces (as demonstrated in the figures to be described later). As an additional or alternative smoothing procedure, the power beam energy density may be reduced during step 3) with respect to the one or more previous movements of the beam, so as to smooth the edges of the projection(s) and/or hole(s) formed.

A further important application of the present invention is in the joining of workpieces, particularly of different materials such as metals and composites. It is also relevant, but not exclusively, to metal to metal joints, plastic to plastic joints, ceramic to ceramic joints and combinations thereof.

The benefits of composite structures compared to metal parts are well known to those versed in the art. However, there are still many instances where ultimate property limitations or industrial conservatism and/or fabrication penalties have impeded their use. In view of this, compromises are sought that combine composites and other materials in the most effective way. The most common examples of this would be through a combination of mechanical fastening and adhesive bonding.

Such hybrid joints are used extensively over a wide variety of industry sectors such as aerospace and automotive. However their limitations are well documented, the most significant being the lack of efficient and smooth load transfer as opposed to using adhesives in isolation. These limitations are addressed through over design which often defeats the original objectives of using the composite material.

US-A-H788 discloses one example of a method of bonding plastic to metal in which holes are formed in the surface of the metal by chemical etching or milling. These holes at least in part increase in width with depth of etching so that when a plastic layer is applied, it will interlock with the metallic surface.

CA-A-2302964 (generally corresponding to EP-A-1048442 and EP-A-1197316) describes another method of joining metal to plastic in which holes are provided in the metal member through which fibres are looped.

U.S. Pat. No. 5,691,391 describes the injection moulding of a plastics blade onto a spar. U.S. Pat. No. 5,118,257 discloses the joining of a grooved metal member to a composite turbine blade.

In accordance with a second aspect of the present invention a method of preparing a workpiece in the form of a member, for joining to one or more further workpieces, comprising forming a multiplicity of holes in the surface and/or bulk of the member and forming outward projections from the member surface, using the method according to the first aspect of the invention.

The member may therefore be a particular workpiece treated in accordance with the method of the invention, or it may comprise an intermediate body, designed to sit between and effect the desired joining of other workpieces. The invention is therefore particularly suited to the joining of dissimilar workpieces, such as metals and composites, which have quite different properties.

The structure modification method therefore provides an important advantage in the joining together of materials, that is between the member (workpiece) and one or more further workpieces. In particular, this may be achieved by one or more of the size, shape or relative arrangement of the holes, and/or one or more of the size, shape, relative arrangement or chemical composition of the projections, being controlled in a predetermined manner. Many different types of projections and holes are therefore contemplated since the method is applicable to the joining of a large number of material types.

Preferably the projections and/or holes are formed so as to mechanically engage with the workpiece(s) to which the member is joined. The projections and/or holes throughout the member may be tailored to produce optimum mechanical interlocking with the workpiece(s) material(s).

For example, in the case of joining a metallic member to a continuous fibre composite workpiece the metallic projections may be curved to entrap fibres and prevent movement either during processing of the composite or after processing when the joint is stressed. The holes may be of a size that permits the polymer, and possibly the ends of fibres, to flow into the holes and remain entrapped after processing of the composite. In the case of adhesively bonding a metallic member to a metallic workpiece the adhesive may flow into the holes and improve mechanical interlocking after curing. Therefore in processes where the use of adhesives is desired, the holes may be arranged to be of a suitable size to accommodate an adhesive.

The projections may be arranged so as to interact with complementary structures within the workpiece(s). The projections may therefore be tailored to fit inside features (which may or may not be holes) in the workpiece. In one particular application where the member contains shape-memory metals, the shape of the projections and holes may be altered during or after preparation of the joint.

Further advantage can be provided by adapting the method such that the projections and/or holes formed cooperate with the workpiece(s) so as to distribute any stresses within the joint between the workpiece(s) and the member workpiece, and thereby reduce stress concentrations within the joint. Typically projections penetrating deep into their corresponding workpieces are desirable in this case.

Further, the projections and/or holes may be arranged so as to provide predetermined local mechanical, physical or thermal properties. The method can therefore be used to effect the matching of properties between the member and the workpiece(s) to which it is joined. Typically in such a case, the projections and/or holes are arranged in part of the member so as to cause the local thermal and/or mechanical properties in that part of the member to be substantially the same as those of the workpiece(s) to which that part of the member is to be joined in use. An example of this is that the properties of the member may be graded such that the part in contact with the workpiece has mechanical and/or physical and/or thermal properties substantially the same as those of the workpiece. This technique can reduce or prevent stress concentrations that arise at the joint due to mismatches in properties such as modulus and coefficient of thermal expansion.

Like any thermal process, the method according to the invention may induce stresses in the workpiece. By modulating the process characteristics, location and timing, these stresses may be used to control the distortion of the workpiece.

A further benefit following from the method is that the projections and/or holes can be arranged so as to control the manner of failure of the joint. This may provide many benefits such as increased energy absorption prior to failure, ensuring that partial failure of the joint does not result in reduction of the load bearing capacity of the joint, and ensuring damage is detectable before failure occurs. An example of this is in the case of joining a metallic member to a fibre reinforced polymer composite material. Through joint design, failure can be made to initiate as plastic deformation in the metallic member, which is detectable before failure and can absorb large amounts of energy. This is preferable to brittle failure in the composite material, which can be sudden and undetectable.

The physical shape of the member is preferably also arranged so as to maximise the mechanical performance of the joint once formed. The invention provides advantages in a wide variety of joint configurations. Examples of the possible, configurations are provided in FIG. 31. Joints may also consist of multiples or combinations of these joint configurations.

In accordance with a third aspect of the invention we provide a workpiece that has been treated using the methods in accordance with the first or second aspects of the invention. All such workpieces treated using the method, including larger structures resulting from the joining of such treated workpieces to others, are contemplated within the invention.

In accordance with a fourth aspect of the invention a method is provided of joining a first workpiece, modified according to the second aspect of the invention, to one or more further workpieces. The method comprises preparing the first workpiece for joining using the method according to the second aspect of the invention, and then joining the first workpiece so prepared to the further workpiece(s). Part or all of the surface of the workpiece to be joined with the further workpiece(s) may be processed in this way.

Once formed, the workpieces may be further joined to other members using any joining technique known in the art, such as welding, adhesive bonding and co-curing. In the case of the joining of one fibre reinforced polymeric composite material to another or to any other material, the joining process may take place at the same time as the processing of the composite, and the resin may or may not be the only adhesive used.

It may be necessary to pre-treat the workpiece (member) surfaces before joining in such a way as to improve and retain adhesion characteristics. This might require additional processes such as but not restricted to etching, anodising, resin coating and adhesive infusion, all of which are known in the art.

A preferred application of the method is to join fibre reinforced polymeric composite structures to metals. A metallic member is first treated using the invention. Surface preparation as appropriate may also be performed on the member. The metallic member is joined to the composite workpiece during lay-up of the composite material on to the member. The projections and holes are designed such that there is a smoother load transfer and less of a sudden change in mechanical and/or physical and/or thermal properties across the joint than with previous joining methods. The design also allows for failure of the joint to initiate in the metal via plastic deformation rather than a brittle failure in the composite workpiece.

It is envisaged that the workpiece member could be manufactured by a third party in appropriate lengths that could be cut to size by the user when required and the incorporation of the member could be smoothly integrated into the composite fabrication process. For example, the method could be used to provide a metal end to a composite component to enable subsequent joining of the component to a metal structure via metal to metal welding.

This application is particularly suitable for aerospace use where common materials that may be used include, but are not restricted to, aluminium and alloys thereof, titanium and alloys thereof, and carbon fibre reinforced polymeric composite. Other materials that may be used in other industry sectors include stainless steel, glass fibre reinforced and aramid fibre reinforced polymeric composite material, or mixtures thereof, thermoplastic polymers and fibre reinforced thermoplastic composite materials.

A new type of joining method is thus proposed. This addresses the limitations of current hybrid structures by embracing the general concepts of mechanical joining at a macro/micro level, typically in conjunction with adhesive bonding at a micro/molecular level.

An important aspect of this invention relates to the fact that the holes and the external features are formed from the parent (such as metal) material and do not arise from an oxide modification as with anodising or some other chemical process which interacts and chemically changes the surface or the bulk of the material. However anodising or some other chemical process could be used following treatment in accordance with the invention.

The shape and distribution of the projections and holes is important. The holes may or may not be interconnecting but for joining applications preferably they should not be isolated from the surface of the metal i.e. they should be able to be filled with a resin or adhesive before or during the bonding process. Nevertheless the method can provide advantages in some applications where internal porosity is desired, by the creation of isolated holes within the material structure.

Some examples of methods according to the present invention will now be described with reference to the accompanying drawings, in which:—

FIG. 31 is a table showing examples of joint types; and

FIG. 32 is a table showing process parameters.

In all the examples described, the structure modification is carried out by a focussed electron beam (EB) generated using a conventional electron beam source, the beam being moved relative to a substrate. Of course, as mentioned above, the workpiece could be moved relative to the beam or indeed both could be moved. Alternatively other power beams such as lasers could be used.

Figure 1:
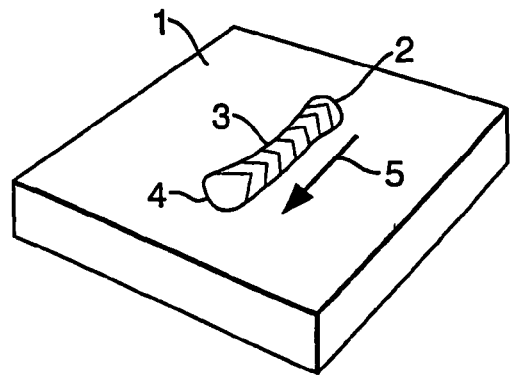
FIG. 1 illustrates a single swipe along a substrate.

FIG. 1 illustrates the formation of a single swipe in a workpiece 1 such as steel. The swipe commences at the location labelled 2 in FIG. 1 causing the formation of a small hump (projection). The beam then moves in a generally linear path 5 to create a melted region 3 and terminates at a point 4 where a small hole (crater or cavity) is formed. This will result in the displacement of substrate material and this is allowed to substantially solidify, generally while the beam is creating swipe(s) in other locations. The beam can then return to this swipe location to repeat the swipe either exactly or in other ways as will be described in more detail below.

Figure 2:
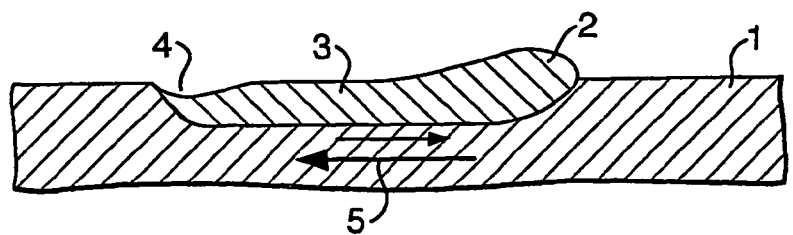
FIG. 2 illustrates the swipe of FIG. 1 in cross-section.

It should be noted that, in this example, the melted material flows in a direction (indicated by a small arrow as shown in FIG. 2) that is opposed to that of the beam path (indicated by arrow 5). Material movement in the examples described occurs via a combination of two distinct mechanisms. The first mechanism utilises the pressure within a translated, vapour-filled cavity (TVFC) in a similar manner to that during electron-beam welding. This pressure effect, once combined with translation of the beam "keyhole", results in a net displacement of material in the reverse direction of the translation. Under these conditions, provided the translation distance along the path ("swipe length") exceeds a distance that is usually about three beam diameters, and solidification of the material proceeds in a uniform manner approximating to the movement of the beam, then the amount of material displaced is fixed, regardless of the swipe length. However, the apparent distance of the net material movement is only dependent on the swipe length in this case. It can therefore be seen that these two parameters may be independently controlled in order to generate the desired effect.

The second mechanism relies upon the variation in surface tension with temperature of the liquid metal. This surface tension temperature gradient (STTG) driven flow is independent of the direction of the "swipe" except in the way in which it affects the temperature distribution within the liquid metal. The STTG material displacement occurs in the following way. Suppose an elongate (at least twice as long as wide), shallow region of material is quickly melted within a larger, essentially flat surface, but does not cool at a uniform rate. Note that the pool will have a slightly convex surface (since the hot liquid metal will have typically a larger volume than the surrounding colder solid). In the absence of any other force such as gravity, vapour pressure from the incident beam and so on, then this convex surface will be uniform in shape. However, if one end of the pool cools before the other, and the surface tension is strongly temperature dependent, then the convex upper surface of the pool will be unstable in shape. If the surface tension is greater at high temperatures, then the hot end of the pool will flatten, and a corresponding volume of material will form a bulge at the cooler end of the pool. If the surface tension is less at high temperature, the converse will occur.

It can be seen that in order for STTG material flow to occur, all that is required is that there is a controlled temperature gradient across a pool of liquid as it cools. Normally the temperature gradient is in the direction of the "swipe", and for surface modification the best "sculpting" result is obtained when the STTG and TVFC effects are additive. However, a low power density beam can be used to displace material in the reverse direction of the swipe if there are other factors which cause a reversal of the temperature gradient within the pool.

For a swipe incorporating a predominantly rectilinear motion in relation to the work 1, the swipe length is typically several times greater than the diameter of the beam. If the swipe path 3 is curved, a typical minimum radius of curvature would be comparable (but not limited to) the beam diameter.

As explained above, each swipe is capable of generating a small pool of molten material, which is translated across the surface of the work 1. In this pool, there is typically a significant surface shaping force, from the vapour pressure arising from the beam incident on the metal surface. The effect of each swipe is to displace a small amount of material. As shown in FIG. 2, typically a small amount of surplus material is seen as a hump 2 at the start of the swipe. A small hole 4 of corresponding size is seen at the finish of the swipe.

Figure 3:
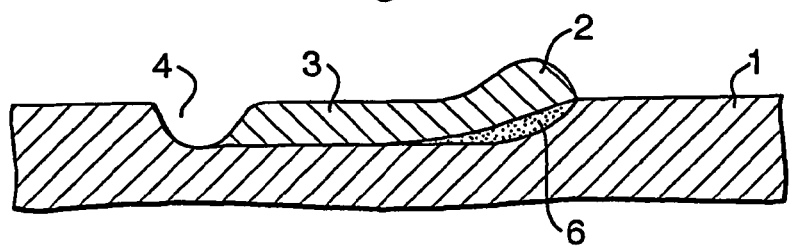
FIGS. 3 to 5 are views similar to FIG. 2 but illustrating two, three and n intersecting swipes respectively.

If a second swipe is exactly superimposed over a first, both the finish hole 4 and the start hump 2 will to a first approximation double in size (FIG. 3). Here the material melted once is indicated at 6, with the region above being twice melted.

Figure 4:
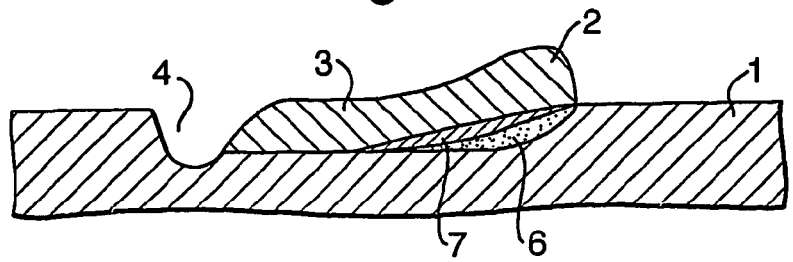

If a third overlapping swipe is superimposed over the first two, the finish hole 4 and start hump 2 will now be approximately three times larger than after the first swipe (FIG. 4). The once melted and twice melted regions of material are indicated at 6 and 7 respectively.

Figure 5:
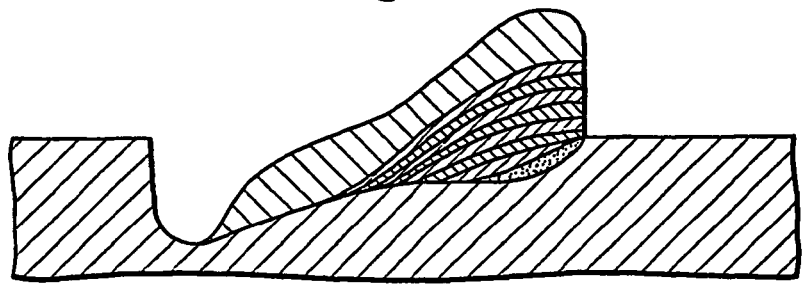
Figure 6:
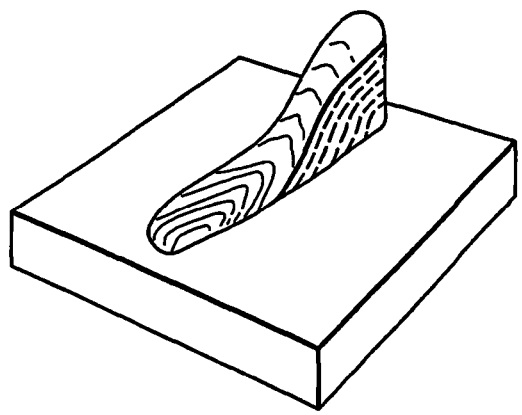
FIG. 6 is a perspective view of the FIG. 5 example.

After a number of overlapping swipes, the material at the start hump 2 may no longer be adequately chilled by the bulk owing to its now remote connection to it. This may result in no further increase in the height of the start hump with further successive swipes of a similar nature because each swipe now remelts nearly all the material from the previous swipe. After a number n of overlapping swipes (FIGS. 5 and 6), the finish hole 4 in the work 1 and the start hump 2 may be of great height/depth to width ratio. When this happens, the incident beam may no longer melt the same quantity of material at the finish crater because of an effective drop in the beam power density per unit area at the point of incidence.

Figure 7:
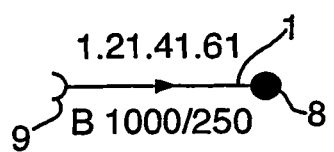
FIGS. 7 to 9 illustrate a notation system.
Figure 8:
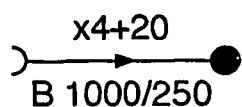
Figure 9:
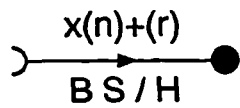

FIGS. 7 to 9 show a notation system for describing some of the examples mentioned below. In FIG. 7, a 1000 swipe pattern is used to produce 250 projections using a swipe pattern of type "B". A start projection is indicated at 8 and an end crater (hole) at 9. A line between these positions shows the beam path and an arrow upon this line indicates the direction of material flow. As shown, projection number "1" is formed from swipe numbers 1, 21, 41, 61. FIG. 8 shows this more generically, indicating the use of four swipes with twenty other swipes at other locations separating them. As shown in FIG. 9, "n" denotes the number of swipes at each location, "r" the number before each revisit, "H" the number of projections and "S" the number of swipes in the repeat pattern.

Figure 10:
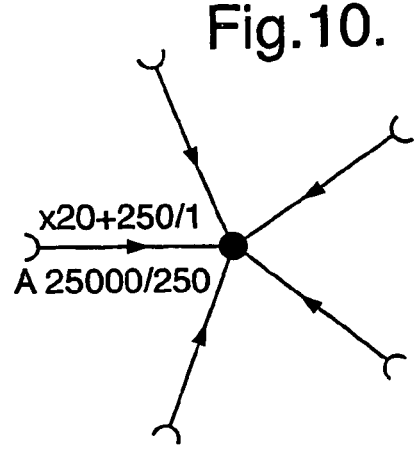
FIG. 10 illustrates the formation of a "super projection"

If the start positions of several different swipes are superimposed, the effect is to make a superimposed start projection many times larger than each of the finish holes, namely a "super projection" (FIG. 10). For this n=20, r=250, H=250 and S=25000. The projections of 5 different swipe positions are superimposed to achieve this.

If none of the finish holes overlap at all but all of the start projections do, then the result will be a general reduction in the height of the substrate surface surrounding a sizeable start projection feature.

Figure 11:
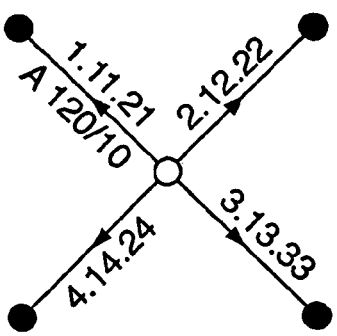
FIG. 11 illustrates the creation of a "super hole"

If the finish holes of several swipes are superimposed, the result may be to make a hole that is several times larger than each of the start projections, i.e. a "super hole" (FIG. 11). Here n=3, r=10, H=10, S=120. Four swipe positions are used to achieve this super hole.

If none of the start projections overlap, but all of the finish holes do, the effect is to make a deep hole that is surrounded by a small plateau raised slightly above the original workpiece surface.

Figure 12:
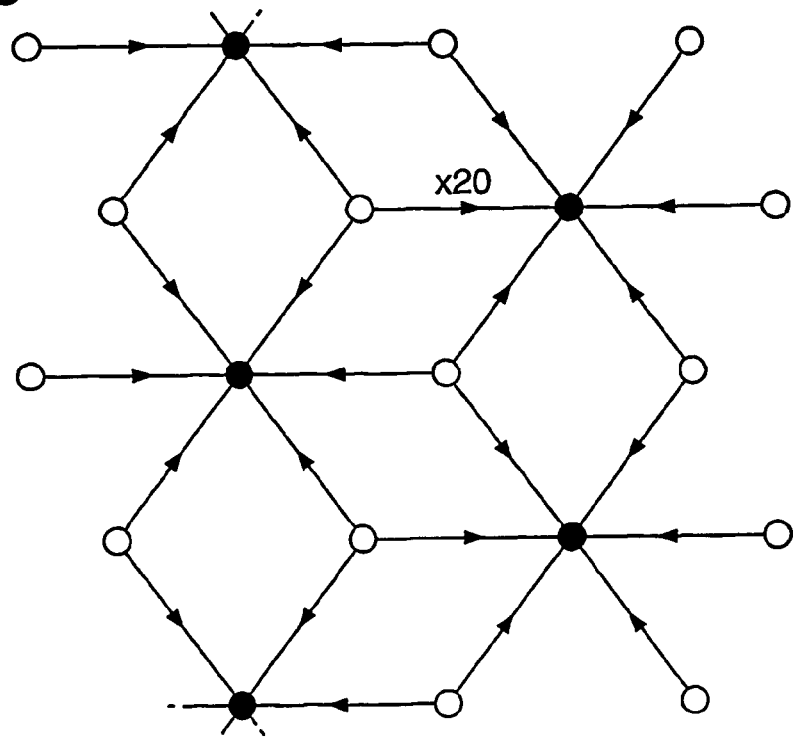
FIG. 12 illustrates the formation of a network of super holes and super projections.

FIG. 12 shows an example of a network of super holes (made from 3 swipe positions each) and super projections (6 swipe positions each). n=20 in this case.

If the workpiece within the regions to be treated is formed from more than one material (for example being plated or coated with a second material), or the work is carried out in a suitable gaseous or liquid environment, a new functional alloy may be created. In the case of a coating, successive swipes can displace material from either the coating itself, or from an exposed area of the substrate as desired. In this way, the composition and properties of a start projection may be graded from top to bottom. Typically the process results in a small loss of processed material as vapour and spatter, particularly when operating significantly in TVFC mode. The more volatile elements are typically lost preferentially from the processed material as vapour. For example, in many materials, 50 to 95% of the processed material may be displaced but remains attached to the workpiece or workpieces after processing.

The loss of certain elements from the base material during treatment with the method may be deliberately used to provide for localised changes in composition, structure and properties if required.

Since the freshly-processed surfaces are clean and receptive to further coating, it may be convenient to carry out this coating during or immediately after treatment with the power beam. In some cases a coating of a preferentially lost element or elements may be readily formed during the process.

If successive linear swipes are carried out at the same location, the result is usually that the start projection is approximately triangular in shape. The sides of the start projection facing away from and to each side of the swipe direction are almost vertical. The other side is usually angled to the substrate surface. The finish hole may also be of corresponding triangular shape.

The geometry of the finish hole may be controlled in a similar way, given that the beam still has line of sight access to the bottom of the hole, which may require a complex beam/workpiece manipulation in the case of an inclined finish hole.

The process is generally applied to a surface perpendicular to the incident power beam direction, but may be applied successfully at other angles to the workpiece surface in many cases.

If carried out in the correct fashion, the process allows the generation of slots in the surface of the work that are parallel-sided.

Slots (elongate holes) in the work can be made to intersect one another at numerous locations. However, correct material displacement is not usually maintained if a new swipe path crosses over an existing slot.

Slots may be many times deeper and longer than they are wide. In suitable section thickness, slots may be made to fully penetrate the work.

The minimum slot width is determined typically by the diameter of that part of the beam (the "core") which possesses sufficient power density to create the shaping force effect described above.

The sides of the slots formed by this process may consist entirely of remelted material, which in EB drilling parlance would be "undefined". In the sculpting process of the invention, the "undefined" material from each swipe usually fuses smoothly with that from previous swipes, provided an appropriate power beam density is used. The result is therefore a slot with remarkably smooth and parallel sides.

By applying the inventive process with a beam of appropriate diameter and power, features of almost any size may be created on any material which exhibits an essentially stable liquid phase under the process conditions.

Special processing conditions may be required in those cases in which the surface tension of the liquid phase is a very strong function of temperature.

If one or more (matching or non-matching) materials is continuously added to what would normally be the "finish hole" region of the work, the net result can be upstanding features on the surface with little or no corresponding holes, if desired. Extra material may be added via the use of conventional techniques e.g. wire or powder. If material is continuously removed from the "start projection" region of the work, the result can be holes in the work with little or no upstanding material. Surplus molten material may be removed via wicking, suction or blowing (e.g. via a gas jet) or by the application of a higher power density beam which causes spontaneous eruption of the molten pool and removal of material from the workpiece. In either case, material may be removed or added by using another separate element, which may comprise a consumable or disposable "palette" which is brought into close proximity to the work. In this case, the swipe path would fall partially onto the work and the palette.

Therefore a workpiece comprising two or more separate parts may be joined, together using the technique. By making projections from one or all parts of the work in the usual way, but so that they bridge across from one part to others, a joint or joints may be made. These joints may be used for many purposes, e.g. mechanical or electrical connection. This is an example of a compound workpiece formed from two or more component workpieces.

In the preferred case, the time between swipes at any one location is not wasted by turning the beam off. Instead the beam is used during this time to process and swipe other areas of the workpiece or alternative workpieces.

The minimum number of separate locations that may be simultaneously processed by a single continuous beam is dictated by the time taken for each location's swipe (or swipes) in relation to the dwell time required at each location between swipes. The maximum number is only limited by the capabilities of the beam deflection/workpiece manipulation system, provided the extra cooling afforded by a longer dwell time than is strictly necessary is tolerated.

In some cases it may be preferred to use multiple power beams simultaneously for carrying out the invention. For example, a simple case is to have a second separate electron gun column identical to the first. Using this approach, each gun column could be used in an identical way to process other parts of a workpiece at the same time. Using this approach, further beam generators can be added as required. An alternative method is to employ multiple beam emitters but with a common beam projection and manipulation system. In this way a multiplicity of beams can be made to work simultaneously without a huge increase in the amount of equipment required. If required, many such systems may be used simultaneously to carry out the process at a faster rate.

In one case, the workpiece may be static in relation to the electron beam generator. A "global" beam deflection pattern manipulates the beam between an array of locations (e.g. a pattern comprising rows and columns of uniform spacing) on the surface of the work. At each location a "motif" deflection may be carried out, comprising one or more "swipes" as required. After a set number of repeats of the "global" deflection pattern, the process is complete, and the beam is terminated.

In another case, "global" and "motif" patterns are used as above. However, in this case, the workpiece is also in motion, such that upon each repetition of the "global" pattern, it is differently superimposed over the work. On each repeat, the first column of locations in the global pattern is now over virgin material, the second column is over those locations which were most recently exposed to the first column, and so on. In modifications of this process:

A) the number of columns in the "global" pattern can be made to equal the required number of visits or swipes at each location. In this way, the process may be applied continuously to a moving strip or sheet of substrate material, with an exactly equivalent net effect at each location (barring those at the start and finish of the run) in every case;

B) if applied to a part of circular symmetry which is rotated during the process, an exactly equivalent action (barring the exact temperature change between two different swipes in some cases) may be obtained at every location on the work. This may be achieved provided the motion of the work is exactly synchronous with the global beam deflection, such that 360 degrees rotation exactly corresponds to an integer number of global pattern repeats;

C) each column in the global pattern may be arranged so as to produce an equivalent swipe pattern at each location, or a different one at each location. In combination with the workpiece motion, this may be used to create more complex or inclined features on the work; or D) if required, material may be added or removed from the work at locations which are fixed in relation to the electron gun.

Figure 13:
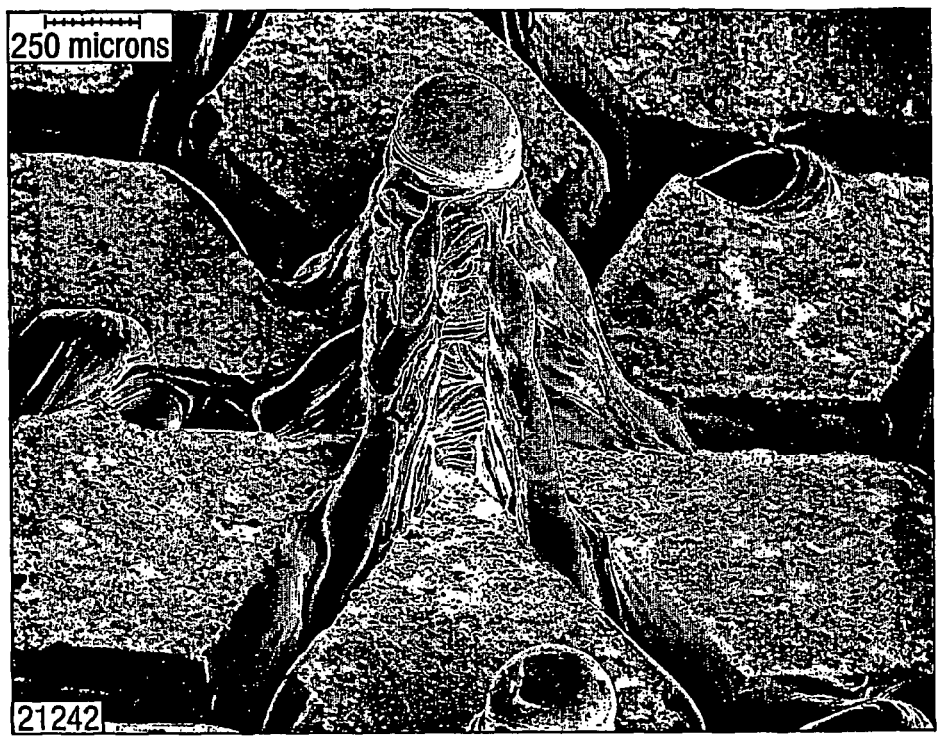
FIG. 13 is a photomicrograph of a super projection in austenitic stainless steel.
Figure 14:
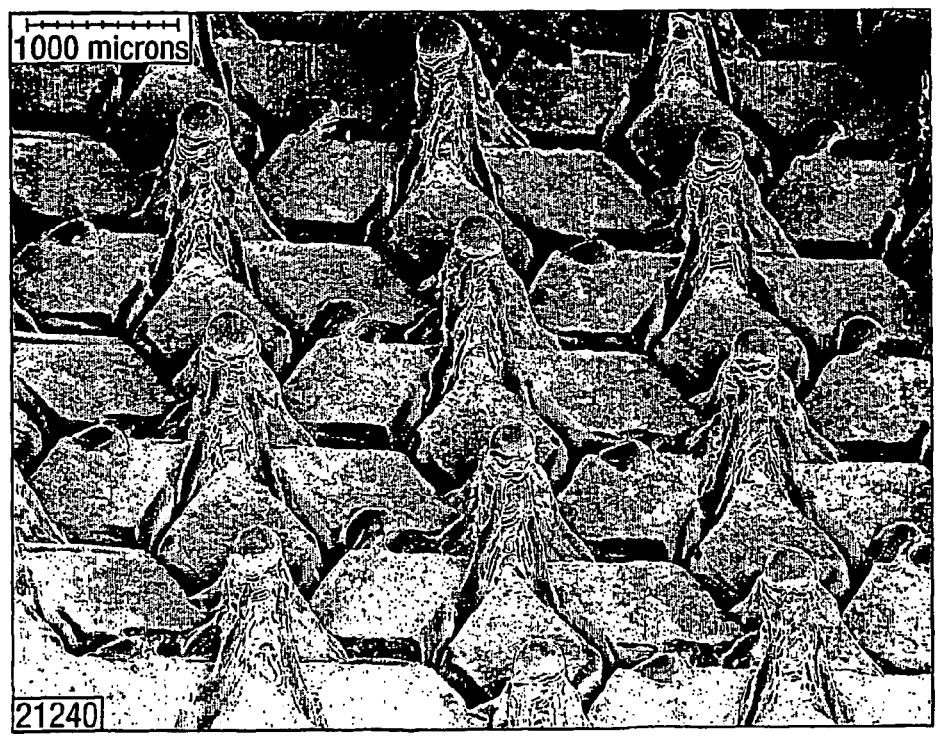
FIG. 14 is a photomicrograph of an area of the substrate shown in FIG. 13.
Figure 15:
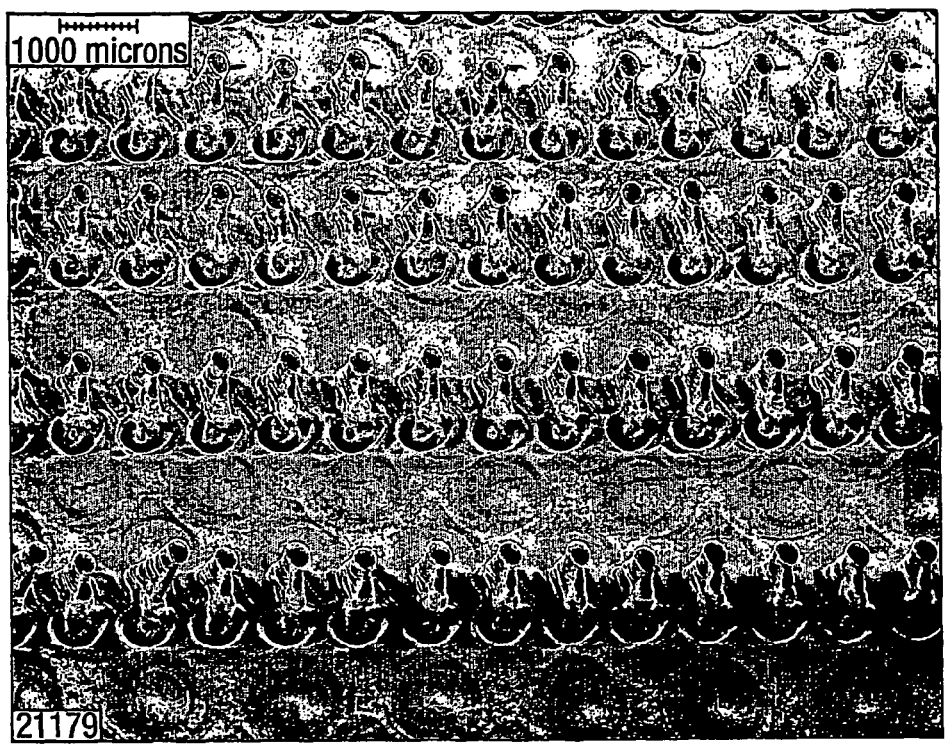
FIG. 15 is a photomicrograph showing projections formed with a partially circular beam path.

Some examples of the application of the method to austenitic stainless steel are shown in FIGS. 13 to 15. FIG. 13 illustrates a single super projection surrounded by six holes. FIG. 14 illustrates the location of the super projection shown in FIG. 13 in relation to its immediate neighbours.

The parameters of these examples are set out in the table within FIG. 32.

Figure 16:
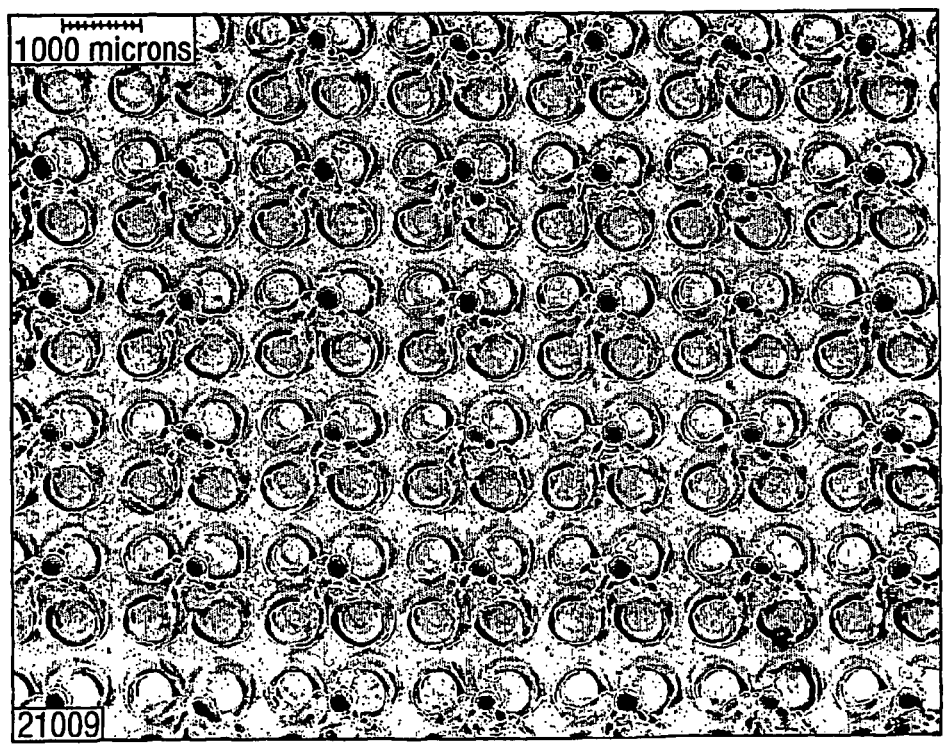
FIG. 16 is a photomicrograph showing the use of multiple curved beam paths.

Examples of structure modification according to the invention using curved beam paths in austenitic stainless steel, are shown in FIGS. 15 and 16. FIG. 15 shows upstanding projections, each formed using a partially curved beam path. In FIG. 16, a central upstanding projection feature is formed at the centre of a 2-by-2 matrix of surrounding curved (partially circular) beam paths. The process parameters used in each cases are detailed in the table of FIG. 32.

Overlapping features can also be achieved using this method. The parameters in FIG. 32 also give details of examples of superimposed successive "sculpting" operations. Details of the beam paths are given in FIGS. 21A to 21F as referenced in FIG. 32. In FIGS. 21A to 21F, dotted lines indicate the general movement of the repeated beam path pattern (solid lines) with respect to the first.

Figure 17:
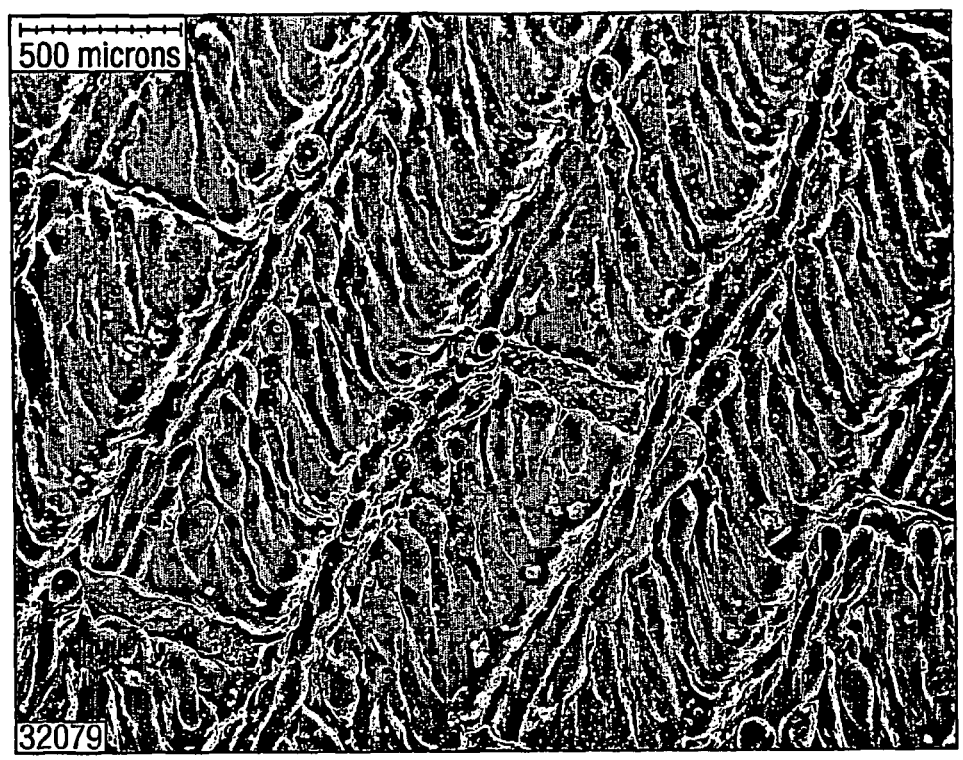
FIG. 17 is a photomicrograph showing ridges.

These enable the creation of more elaborate features. In one example, a number of low, broad ridges of material are made via a first operation. These ridges are then processed via a second operation, which would normally produce holes and projections of roughly equal height below and above the material surface. In this case however, because the holes are generated within a low upstanding ridge of material, the holes do not penetrate deeply into the original thickness of the material. This is one way of making high upstands above the original surface of the material without correspondingly deep holes in the surface. As shown in FIG. 17, a number of "fins" and "slots" are superimposed over the low ridges. Further details are provided in FIG. 32.

If successive linear swipes are started at slightly different locations, e.g. each one requiring a slightly different length path to reach the same finish hole, the result will be a non-vertical start projection feature. In this case, if successively shorter swipe paths are used, the side of the start projection facing away from the swipe direction will also be angled acutely to the substrate surface. This effect may be tailored so as to produce an approximately symmetrical start projection feature.

Alternatively, with a successively longer swipe paths the side of the start projection facing away from the swipe direction will be inclined to the substrate surface so as to produce an overhanging feature.

If successive linear swipes are carried out at the same location but the swipes are not superimposed exactly so that there is a small displacement with each swipe in a direction transverse to the linear swipe direction, the effect will be to produce a start projection that is inclined to the substrate surface.

In these two cases, if neighbouring inclined start projections are made in such a way that they are inclined towards one another, several start projections may be fused together. This may be done in such a way as to create a "loop" or "loops" of fused material standing proud of the substrate surface.

Returning to the production of "overhanging" (slanting) features, the true length of the melted path made by each "swipe" is slightly greater than the actual length of the swipe, by an amount related to the diameter of the electron beam, the material properties, and the speed of the swipe. This means that the material displaced by a single swipe can be made to overhang or project beyond the start of the previous swipe or an edge feature at the start of the swipe. If successive swipes are repositioned, each made to start in a successively more overhanging position, then the overhang can be made to project further out beyond the edge.

In this way, holes formed in a workpiece of thick section can be made to be partially blocked by metal projections at the top surface. An application of this is in the manufacture of fine filters from monolithic parts with relatively large holes drilled in them. The slots or holes which are created when the projecting material is displaced allow the free transfer of liquid material across the surface if this is required. This enhances the flow of liquid from regions between the holes.

Figure 18:
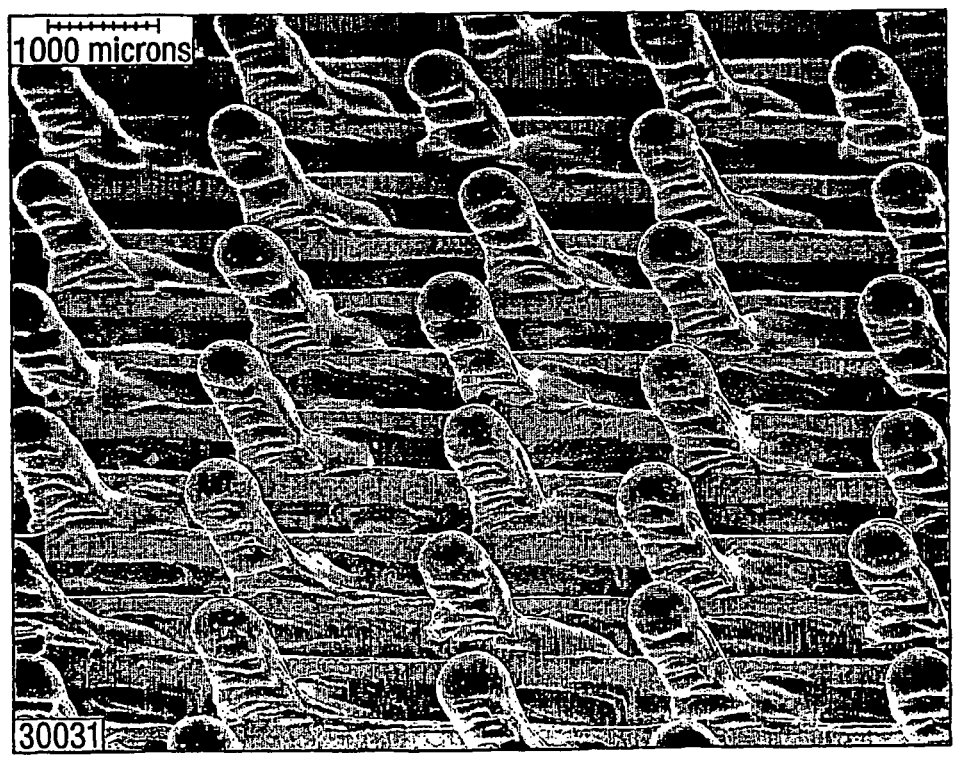
FIG. 18 is a photomicrograph showing overhanging features.

If successive displaced swipes are executed on a flat surface, projecting features can be made that lean backwards giving a hook-like appearance. An example application of this is in the load transfer between a fibre-reinforced material and a metal substrate. FIG. 18 shows an example of such overhanging features, with the process parameters indicated in FIG. 32. In fact using a modification to the parameters indicated in the FIG. 32 table, fully penetrating holes can be formed in a 2 millimetres thick workpiece of the titanium alloy used.

The modification involves introducing a pause to allow the material to cool, thereby reducing distortion of the workpiece.

Figure 19:
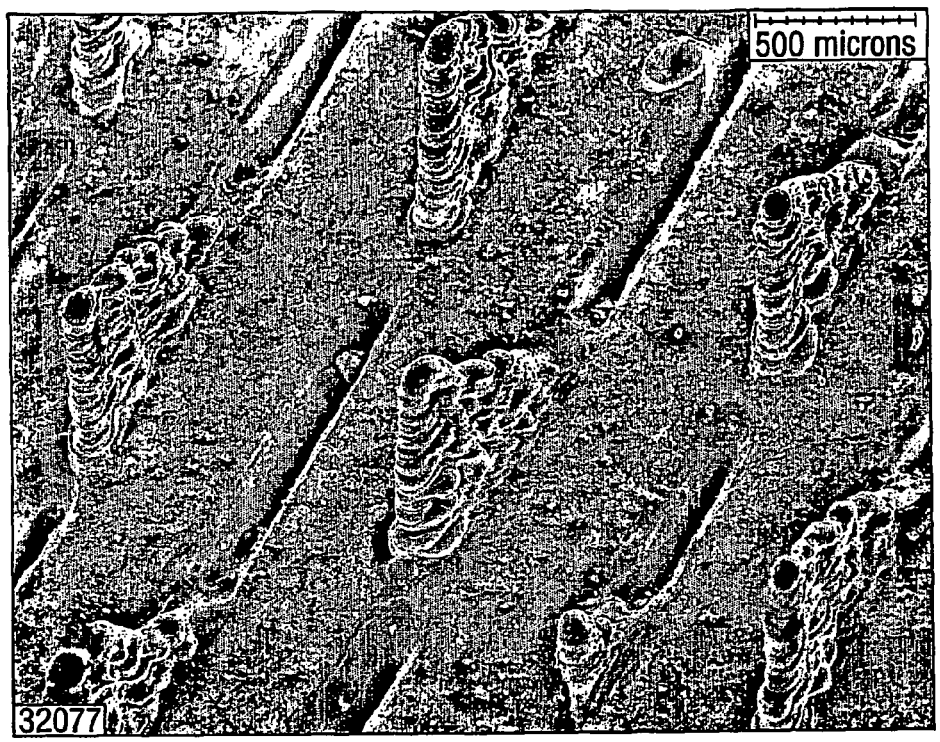
FIG. 19 is a photomicrograph showing holes and triangular projections.

FIG. 19 illustrates the use of the method in a mild steel sample T299.

Figure 20:
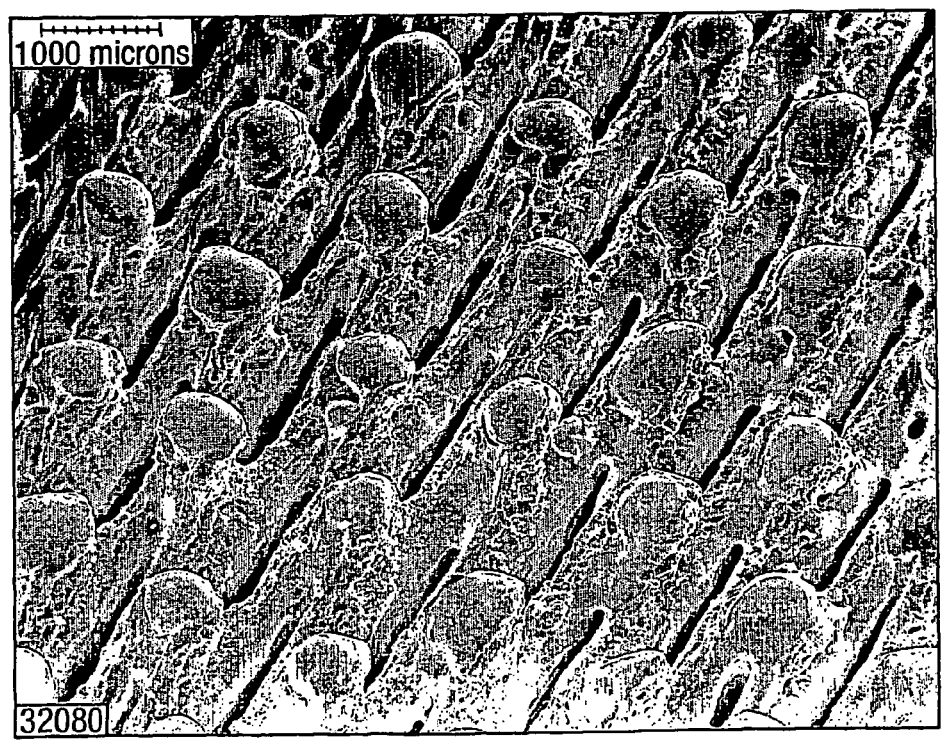
FIG. 20 is a photomicrograph showing holes and projections in a modified surface structure.
Figure 21A:
FIG. 21A to 21F show various motifs in accordance with the table of FIG. 32.
Figure 21B:
Figure 21C:
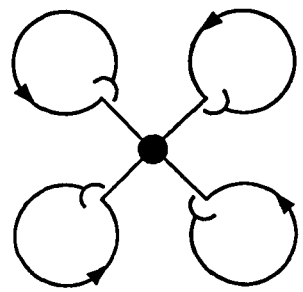
Figure 21D:
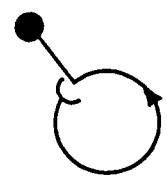
Figure 21E:
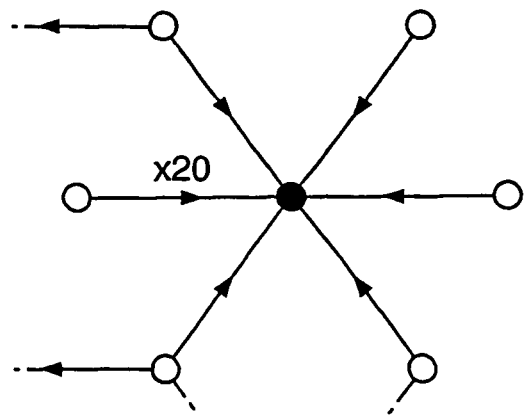
Figure 21F:

FIG. 20 shows a further example in A1 5083, T291. In each case, further details are provided in FIG. 32.

The "sculptability" of a material depends on a number of parameters, including those listed in the table of FIG. 32. In addition, the purity of the material has a significant effect. Both local inhomogeneities in the material, or quantities of dissolved volatile elements make large differences to the 'sculptabilty' of the material.

In some cases such as where it is intended to produce an essentially broad, flat depression, or ridge in the work, the initial excavation of the "hole" may best be carried out using a relatively intense beam. This may leave the hole and the ridge relatively rough in surface appearance. By utilising a beam of lower power density either in the final stages of excavation, or as a subsequent operation, the rate of material displacement may be greatly reduced, but a smoother finish to the hole or ridge may be generated.

The invention can be implemented using various angles between the beam and the workpiece surface. It is commonly held that various power beam processes may only operate on surfaces that are angled away from being normal to the beam up to a certain point. This limits the drilling of shallow-angled holes using such beams. This effect is due to a geometric power density reduction as a (say) round spot becomes elliptical on the surface of the work and due to the typically increased reflectivity of the surface to the incoming beam at shallow approach angles. For laser/electron beam drilling or other useful processes, the power density required for the intended process is substantially more than is required to melt the material. However, with the present invention, even if the power density is only sufficient to melt the material, it is possible to execute structure modification provided the STTG driven flow mechanism is operative in the material in question. Such an operation can be used to produce a change in the local inclination of the workpiece. It is therefore possible to perform this locally on an inclined workpiece as a precursor to a subsequent operation that requires a higher power density in the beam.

A further example is now described which illustrates the use of the invention in the important application of preparing workpiece structures to be joined.

Figure 22:
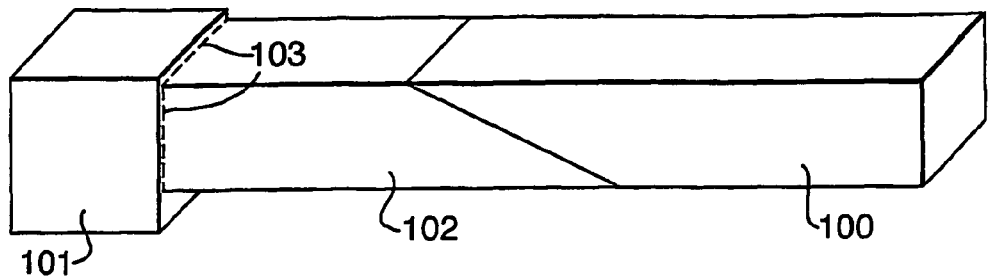
FIG. 22 is a perspective view of a joint containing a workpiece modified according to the invention.

The overall appearance of such a joint made according to a first of these examples is illustrated in FIG. 22 which illustrates a first composite workpiece 100 joined to a second metallic workpiece 101 using an intermediate member 102. The join between the metallic components 101 and 102 is achieved by a joining method as described below. The weld is indicated at 103.

Figure 23:
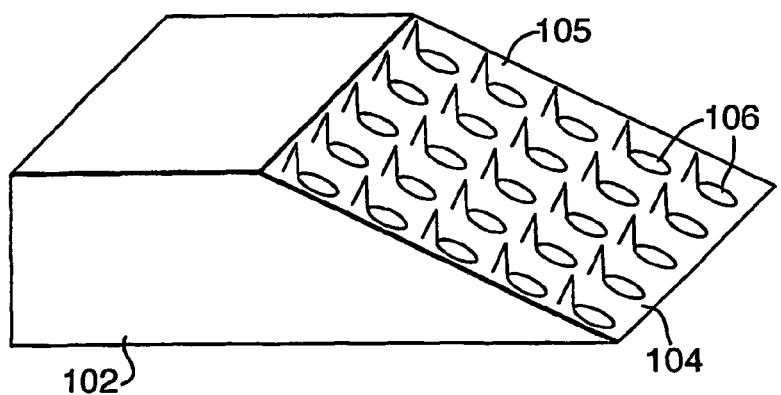
FIG. 23 is a perspective view of the workpiece member.

As illustrated in FIG. 23, in the present example the metallic intermediate member 102 is formed by machining some titanium into the general shape required for an asymmetric scarf joint. Some examples of the large number of other possible joint configurations are shown in FIG. 31.

The surface 104 to be joined to the composite workpiece 100 is shown in FIG. 23. Following machining the surface is then treated with an electron beam system using the structure modification method of the invention. In this case the treatment method is applied to the entirety of the surface 104 so as to produce an ordered array of projections 105 and holes 106 (shown schematically in FIG. 23).

It should be noted that different patterns formed by the relative arrangement of projections and holes can be used to tailor such members to different specific requirements. In the present example, each of the projections are arranged as spikes, with each spike being similar in shape and size. Likewise, the holes are each of a similar shape and size with respect to one another. Such similarity is of course not essential but in the present example it provides some convenience in simplifying the process parameters for the structure modification.

Where such similarities are not used, in particular the shape and size of the projections may differ in different areas of the surface to be joined, so as to give different joint properties in those areas. Projections can also be produced at different angles, rather than being substantially normal to the general surface from which they project. Angled projections have advantages in trapping fibres in composites and preventing them from moving under load. However, for a given length of projection, the smaller the angle to the surface, the smaller the distance the projection would reach into the composite material and therefore any stresses will not be transferred through as great a depth of composite. This is one example of where the height of the projections should be tailored carefully.

The shape of the projections may also be different in different parts of the member. In some instances a hook shape may be beneficial to the joint strength.

In this example the chemical composition of the projections might also be made to vary in different areas of the member workpiece. This can be achieved by various mechanisms, some of which are:

a) Preferential vaporisation of part of a metallic member alloy during the power beam processing;
b) Use of a member having several layers where mixing of the material from the layers occurs during power beam processing;
c) Addition of extra material during processing.

In a similar manner to the projections, the size, shape and so on, of the holes produced might also be different in different areas of the member.

Certain mechanical, physical and thermal properties, along with some effects that occur due to values in these properties, are dependent upon the local density of the material in the member. This in turn depends on the volume of holes created. For example, problems that arise due to mismatches in values of properties between the member and the workpiece to which it is joined, can be reduced or removed by careful design of the form of the holes and their density in different areas of the member.

Returning to the present example, following treatment of the surface in accordance with the invention, the surface may then be further treated in a manner appropriate to enhance and retain adhesion characteristics, such as by grit blasting, etching or anodising.

Figure 24:
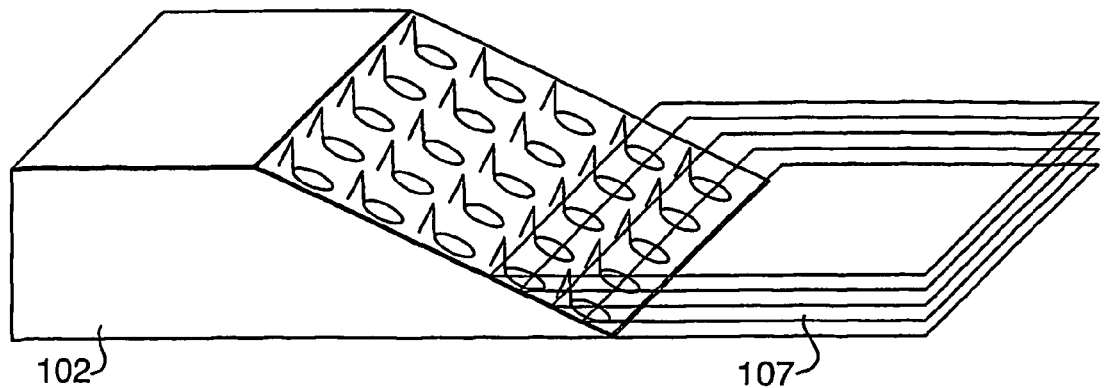
FIG. 24 shows the lay up of layers of composite onto the workpiece.

Layers 107 of carbon fibre reinforced epoxy "prepreg" are then laid up on the treated member surface as shown in FIG. 24. Once the lay-up of prepreg is complete, the entire lay-up is placed in an autoclave and cured in a conventional manner. While the material and fabrication method for the composite panel used in this instance are carbon fibre reinforced epoxy prepreg cured in an autoclave, it will be appreciated that many other materials and fabrication methods can be used to effect a metal to composite joint.

A first alternative example comprises the lay-up of a dry fibrous preform onto the member followed by vacuum infusion of the resin into the preform. Indeed there are many examples of suitable materials. In the case of an aerospace component the fibre might be carbon, the preform might be woven, knitted, non-crimp fabric or braided, the resin might be epoxy and the part might be heat cured. In the case of a marine component, the fibre might be glass, the resin might be vinylester or polyester and the part might be room temperature cured.

A second alternative comprises the lay-up of carbon fibre reinforced thermoplastic prepreg onto the member followed by consolidation in a hot press.

Any fabrication process, such as those discussed above, might require additional resin or adhesive to be added during lay-up at the interface between the member and workpiece to ensure flow into at least some of the holes.

Figure 25:
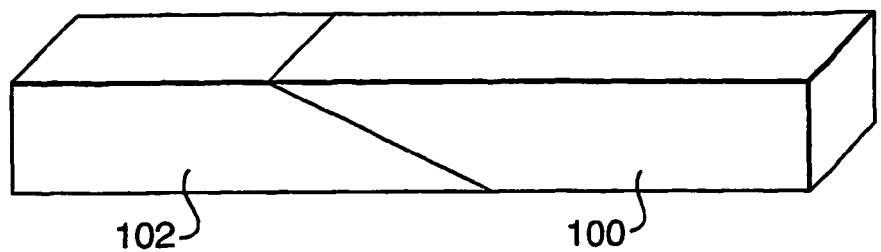
FIG. 25 shows a further view of the bonded workpiece and composite.
Figure 26:
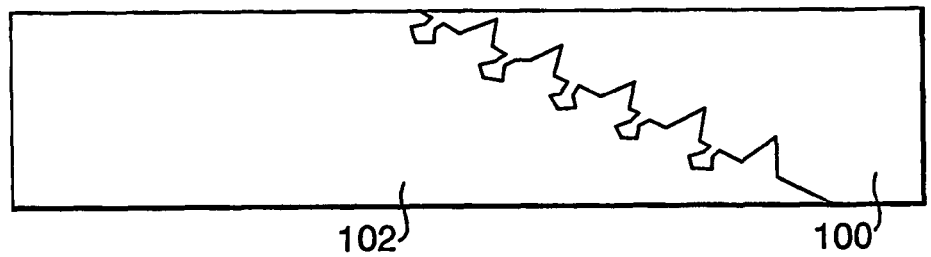
FIG. 26 is a schematic sectional view showing the interaction between the projections and the composite.

Upon removal from the autoclave, the final product comprises, a composite structure 100 with a metallic end 102. This is illustrated in FIG. 25. An illustration of a cross-section through the structure is shown in FIG. 26. This shows that the metallic projections from the member protruded into the composite part of the product. Similarly the resin and possibly some of the fibres from the composite part of the product flowed into the holes in the member.

Figure 27:
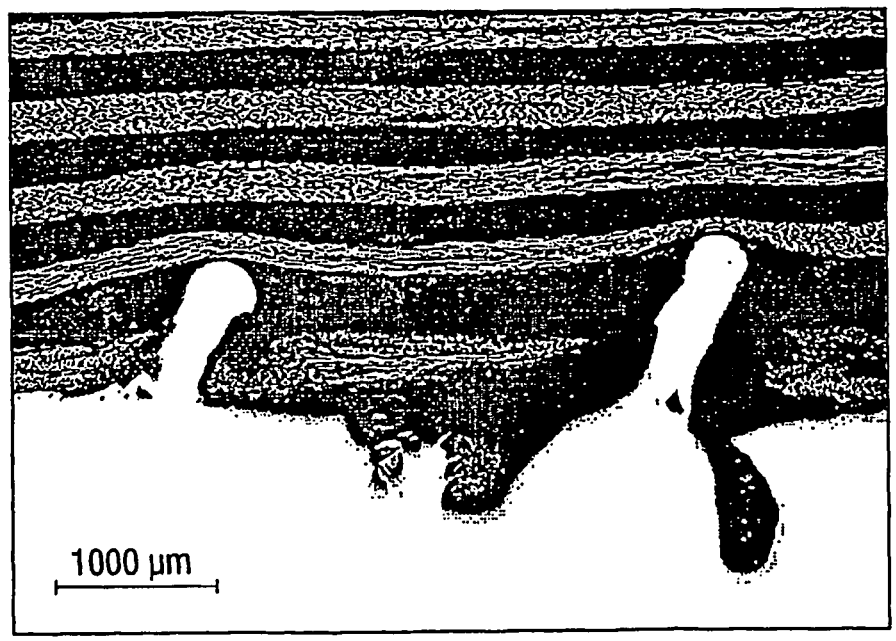
FIG. 27 shows an example of the interaction between projecting and fibre composite layers.

FIG. 27 shows a cross section through an actual joint with the metallic projections in white protruding up into the layers of composite. Such engagement by the projections with the workpiece provides improved mechanical interlocking and stress transfer through the thickness of the composite workpiece.

It will be appreciated that the load transfer between the member and a fibre-reinforced composite will be spread over several layers of the composite fibre reinforcement, because of the way in which the projections penetrate these layers. Because the projections can be made to be many times higher than they are wide, when the joint is stressed, a significant elastic bending stress is induced in them. In the simplest case, a small applied load makes an approximately parallel-sided projection elastically deform in the way predicted by classical compound-loaded cantilever beam theory. However, the projections can be made with almost any profile, to allow for the shear modulus of the composite as well as complex joint loadings that may arise in practice. This means that the load distribution in the joint may be beneficially altered and controlled in a way not normally possible.

Similarly, because the projections may be differently oriented, and/or profiled to have different bending properties in different directions, the load transfer between composite and metal parts may be made anisotropic so as to better match the anisotropy of the composite material.

As a further step in the process of the present example, and as mentioned earlier, the metallic intermediate member 102 may then be joined to the metallic structure as shown in FIG. 22 to produce a composite component integrated into a metallic structure. Any suitable joining technique might be used to effect a joint between the metallic part of the product and the metallic structure, these include bolting, diffusion bonding, laser welding, friction stir welding, electron beam welding or resistance welding.

Figure 28:
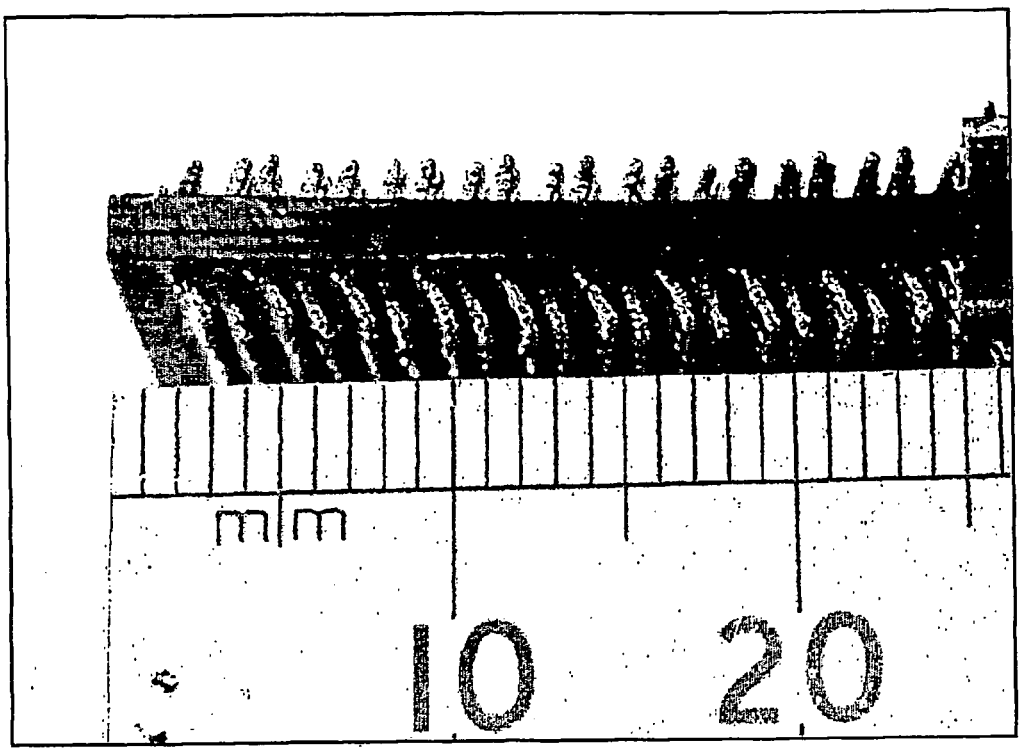
FIG. 28 is an image of projections in a workpiece.

An image of a typical workpiece is shown in FIG. 28. This shows a titanium workpiece for a step joint having a number of projections upon some of its bonding surfaces. The projections each have a length of about 2 millimetres. These are angled to the surface such that their maximum height above the surface was about 1.5 millimetres. Similarly, the holes have a depth of about 1.5 to 2 millimetres. Carbon fibre prepreg is then laid up on these projections to give a thickness of penetrated composite of about 2.5 millimetres. In such applications, typically carbon fibre prepreg is laid up to thicknesses of between 1 and 15 millimetres depending upon the properties required.

Dimensions for these structures to be joined will vary but could cover virtually any composite thickness from microns to metres.

It will be appreciated that the surface and/or structure modification of the invention provides advantages in a number of applications. Some of these are now briefly discussed below.

A) Manufacture of different hole/duct profiles (e.g. the "NACA" duct shape), for shaping gas or liquid flow, or pressure waves.

B) Manufacture of moulds/dies for novel surface textures/functionality and deeper structural modification. Also surface hardening in some materials is possible using the method. Holes in the mould can also be used for outgassing and gas infusion (for mould release).

C) Treatment of low modulus materials (eg rubbers) and/or the moulds used to make them, so as to incorporate deep narrow features that would otherwise be problematic to manufacture, in for example, new designs for tyres. New tyre structures can be produced for improved water management and noise reduction.

D) Manufacture of prostheses, implants and other biomechanical engineering structures with metallic, ceramic or polymeric components for enhanced bonding to biological matter (such as bones) using treatments which accurately mimic naturally biocompatible surfaces. Load bearing biomechanical joint surfaces can also be treated for improved performance.

E) Production of surfaces with controlled topography and/or chemical composition, for tribological applications. For example, by processing a plated surface, small holes and small islands of hard, intermetallic material may be made, within an essentially soft matrix. This or other process variants may be used for the manufacture of bearing surfaces.

F) Production of electronic 'Z' connections in electronic circuitry by creating high aspect ratio upstands.

G) Production of numerous holes in boat hulls for gas flow to provide for a 'gas-assisted boundary layer' (GABL), thereby reducing drag. In aircraft aerofoil surface materials, material treated using the invention may also be used, for example to draw part of the flow into the wing to maintain the required flow conditions external to the surface.

Figure 29:
FIG. 29 shows the formation of "aerosheet"

H) Material preparation for diffusion bonding to make new materials (eg. aerosheet) by the generation of a regular array of upstanding projections (see FIG. 29). Aerosheet can be produced by bonding treated sheets together to leave voids at the centreline of the sheet material. Interconnected porosity sheet can be produced by bonding appropriately treated surfaces together, allowing cooling fluid/gas, or chemically active species to progress along the sheet centreline. Microporous sheet can also be produced by forming penetrating holes in either the top or bottom faces of the sheets prior to bonding.

By treating one or more pieces of material using the invention, which are then joined to one another, or to one or more untreated pieces of material, the resultant product may have enhanced properties. Joining techniques that may be used include all forms of welding, diffusion bonding, brazing, adhesive bonding and mechanical joining. For example, this may be used in the manufacture of low density high stiffness sheet material and parts containing internal voids and channels. If diffusion bonded titanium sheets are produced in this way to produce aerosheet, the resultant material may have significantly enhanced specific properties. In this case the material may also be welded, cut, formed and joined using substantially conventional techniques. Treated panels may be assembled and edge welded (e.g. via EBW) to give an evacuated sealed package ready for joining via HIPing to give this type of material. The connections between the assembled sheets may be tailored to provide optimum mechanical, thermal or other properties as the application demands. If the inventive treatment is made to produce fully penetrating holes in one or more parts of the structure, then fluids may be passed through these holes and/or the internal voids, e.g. for cooling, heating, mixing, drag reduction, or chemical reaction purposes. By joining sheets of different materials together, advanced composite structures may be made, for example by taking metallic facing sheets that have been treated using the invention and bonding them to a low density honeycomb core.

I) Sonically active surfaces can be produced by treating material using the method for sound wave destruction or reflection.

J) Shape memory metals can be treated to give active functionalities. Bulk material may be locally modified chemically and geometrically to give functional regions that are locally of a shape memory alloy composition.

K) Processing of optical elements can be achieved with the method so as to modify the optical properties (eg transmission and reflection) of a surface, for example with holographic functionality.

L) Production of sensors can be achieved by using the method to effect a precise and/or regular array of holes or upstands, for example in linear encoders.

M) Apparatus such as heat exchangers, catalytic converters and through-flow chemical reaction vessels can all be produced with improved properties by using the method to produce appropriate channels/holes and/or surface projection in appropriate components.

N) Bi-metallic surface functionalities can be achieved by processing a surface to which an additional material has been added, so as to make surface features which comprise layers which are of two or more different compositions.

O) Production of diesel injectors can also be performed using the method, with particular regard to the hydrodynamic properties of the nozzle, and its ability to vaporise the ejected fuel. Surface hardening of remelted material (produced by the method) can be used to improve wear properties. In addition, nozzle features may be made in which a swirling motion is imparted to the flow through the nozzle. This can for example also allow the volumetric flow properties to be automatically compensated for as nozzle wear occurs in service.

Figure 30:
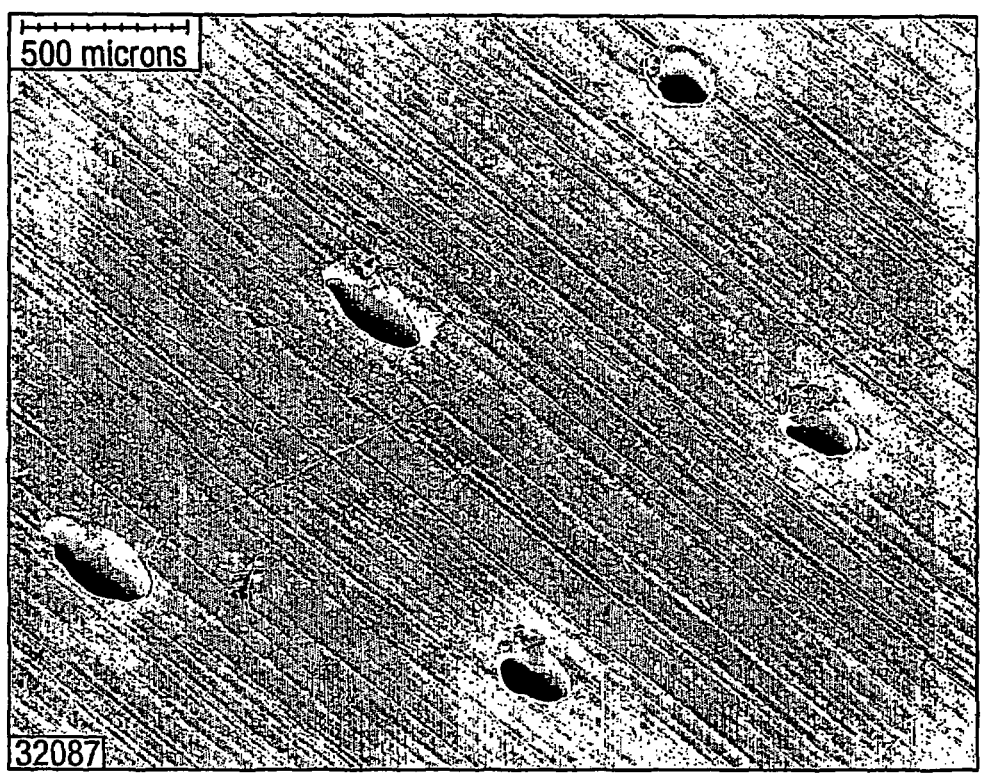
FIG. 30 shows penetrating holes on the underside of a treated workpiece.

P) Production of burr-free holes can also be achieved using the method. When fully penetrating holes are made, under the correct conditions holes virtually free of burrs are formed on the far side of the workpiece. Holes of this type may used in many applications in which a burr free hole edge is required. These may include various cutting or shearing processes, as well as processes in which a fluid flow over a perforated surface is least disturbed by having burr-free edges. An example is shown in FIG. 30.

Q) Various treatments may be applied to condition the surface following treatment using the method. For example, any coating or chemical conversion treatment may be carried out. Also, various mechanical treatments may be carried out on the processed surface. For example, the projections may be deformed into a new functional shape, or simply deformed to give perfect uniformity of height or conformation to a mating part. Joints assembled with such surfaces can have superior thermal and electrical contact than would normally be expected from the applied load, smoothness and flatness, because of the mode of local deformation and contact at the interface.

R) The method may be used to alter various potential gradients (including chemical, electrical, magnetic) local to a surface, thereby altering the deposition or removal of material at the surface, or the progress of a chemical reaction at the surface.

S) The production of crystallographically textured/oriented material and surfaces may be achieved with the method. Typically, projections and other features that "grow" via successive swipes do so initially via conventional heterogeneous nucleation and growth. However, under the correct conditions, features may be made to grow in such a way as to acquire a specific grain orientation or crystallographic texture. This may, for example, be used to give specific material structure/properties in its own right, or to control the crystallographic orientation and/or growth morphology of material that is subsequently deposited, or grows from a liquid or gaseous phase onto the workpiece.

T) Anisotropic micro-particles and fibres can also be produced. By implementing a different process step subsequent to their formation, these features may be detached from the workpiece in the form of anisotropic fibres or particles.

The invention claimed is:

1. A method of modifying the structure of a workpiece, the method comprising:
   1) causing relative movement between a power beam and the workpiece so that a region of the workpiece is melted and the melted material displaced to form a projection at a first location in the region and a hole at a different location in the region;
   2) allowing the melted material at least partially to solidify; and thereafter
   3) repeating step 1) numerous times, wherein the region which corresponds to each repeat intersects the region of step 1) and wherein the melted material is displaced during the numerous repetitions of step 1) such that either or each of the said projection or hole are increased in size in comparison with their respective size following a preceding application of step 1).

2. A method according to claim 1, wherein step 3) further comprises repeating step 2) following each repeat of step 1).

3. A method according to claim 1, wherein the region is defined by the beam being caused to travel relative to the workpiece along a path from a start position to a finish position.

4. A method according to claim 3, wherein the first location is at one of the start or finish positions and the different location is at the other of the start or finish positions.

5. A method according to claim 3, wherein the path is at least three beam diameters in length.

6. A method according to claim 1, wherein at least part of the region is elongate.

7. A method according to claim 6, wherein the region is substantially rectilinear.

8. A method according to claim 1, wherein at least part of the region is curved.

9. A method according to claim 1, wherein the modification comprises a modification of substantially the bulk structure of the workpiece.

10. A method according to claim 1, wherein the modification comprises a modification of substantially the surface structure of the workpiece.

11. A method according to claim 1, wherein each of the regions of step 3) coincides substantially with the region of step 1).

12. A method according to claim 1, further comprising forming one or more groups of regions, each group intersecting the region of step 1).

13. A method according to claim 12, wherein the holes of each group are substantially co-incident with the hole of the region of step 1).

14. A method according to claim 12, wherein the projections of each group are substantially coincident with the projection of the region of step 1).

15. A method according to claim 12, wherein the groups of regions are arranged in a regular array.

16. A method according to claim 1, wherein during step 2), the power beam forms one or more regions elsewhere on the workpiece.

17. A method according to claim 1, wherein the workpiece is provided with another material so that one or more alloys are formed during performance of the method.

18. A method according to claim 1, wherein steps 1)-3) are carried out in a gaseous atmosphere so that one or more alloys is formed.

19. A method according to claim 1, wherein the intersecting regions are arranged so as to form projections which overhang the workpiece surface.

20. A method according to claim 19, wherein two or more overhanging projections are joined so as to form one or more loops above the workpiece surface.

21. A method according to claim 1, wherein the power beam energy density is reduced during step 3) with respect to the one or more previous movements of the power beam, so as to smooth the edges of the projection and/or hole formed.

22. A method of preparing a workpiece in the form of a member, for joining to one or more further workpieces, comprising forming a multiplicity of holes in the surface and/or bulk of the member and forming outward projections from the member surface, using the method according to claim 1.

23. A method according to claim 22, wherein one or more of the size, shape or relative arrangement of the holes, and/or one or more of the size, shape, relative arrangement or chemical composition of the projections, is controlled in a predetermined manner.

24. A method according to claim 22, wherein the projections and/or holes are formed so as to mechanically engage with the workpiece(s) to which the member is joined.

25. A method according to claim 24, wherein the projections are arranged so as to interact with complementary structures within the workpiece(s).

26. A method according to claim 22, wherein the holes are of a suitable size to accommodate an adhesive or resin.

27. A method according to claim 22, wherein the projections and/or holes are formed such that, in use, the projections and/or holes cooperate with the workpiece(s) so as to distribute any stresses within the joint between the workpiece(s) and the member, and thereby reduce stress concentrations within the joint.

28. A method according to claim 22, wherein the projections and/or holes are arranged so as to provide predetermined local mechanical, physical or thermal properties.

29. A method according to claim 28, wherein the projections and/or holes are arranged in at least part of the member so as to cause the local thermal and/or mechanical properties in that part of the member to be substantially the same as those of the workpiece(s) to which that part of the member is to be joined in use.

30. A method according to claim 22, wherein the projections and/or holes are arranged so as to control the manner of failure of the joint.

31. A method according to claim 22, wherein the member is an intermediate member for use in joining two or more further workpieces together.

32. A method of joining a first workpiece to one or more further workpieces, comprising preparing the first workpiece for joining using the method according to claim 22, and joining the first workpiece to the one or more further workpiece(s).

33. The method according to claim 2 wherein the region is defined by the beam being caused to travel relative to the workpiece along a path from a start position to a finish position, and wherein the path is at least three beam diameters in length.

34. The method according to claim 2, wherein the projection is further built up and/or the hole is further excavated as a result of step 3).

35. The method according to claim 2, wherein repeated intersection of the regions causes one or each of the projection or hole to increase in size.

36. The method according to claim 2, wherein material is repeatedly displaced so as to form a different geometry or structure as a result of each repeat according to step 3) due to the at least partial solidification between each repeat according to step 2).

37. The method according to claim 2, wherein in step 3) the melted material is displaced so as to at least partially solidify upon the material which was melted during a previous step 1).

38. The method according to claim 1, wherein the beam travels along a respective beam path during each repeat of step 1), and wherein a plurality of intersecting beam paths are used to form the projection or hole and wherein for each beam path the respective molten material displaced is allowed to at least partially solidify before the beam is caused to travel along a subsequent said beam path.

39. The method according to claim 2, wherein material is repeatedly displaced so as to form a different geometry or structure as a result of each repeat according to step 3) due to the at least partial solidification between each repeat according to step 2).

40. A method of modifying the structure of a workpiece, by the controlled formation of numerous features of predetermined geometry using a power beam, wherein each feature is positioned at a predetermined location and wherein each of the numerous features is formed according to the steps of:
1) causing relative movement between a power beam and the workpiece so that a region of the workpiece is melted and the melted material displaced to form a projection at a first location in the region and a hole at a different location in the region;
2) allowing the melted material at least partially to solidify; and thereafter
3) repeating steps 1) and 2), numerous times, wherein the region which corresponds to each repeat according to step 3) intersects the region of step 1), wherein for each repeat of step 1) the beam travels along a respective beam path having a length of three or more beam diameters, wherein a plurality of intersecting beam paths according to step 3) are used to form the said projection or said hole, wherein for each beam path at least part of the molten material displaced is allowed to solidify before the beam is caused to travel along a subsequent said beam path and wherein for each beam path said at least partial solidifying of said material either adds material to the said projection or removes material from the said hole, so as to form a different geometry or structure of the said projection or hole as a result of the numerous repeats according to step 3).

\* \* \* \* \*